United States Patent
Kim

(10) Patent No.: US 9,626,012 B2
(45) Date of Patent: Apr. 18, 2017

(54) METHOD FOR GENERATING POINTER MOVEMENT VALUE AND POINTING DEVICE USING THE SAME

(75) Inventor: Jong Bok Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 14/235,990

(22) PCT Filed: Aug. 1, 2012

(86) PCT No.: PCT/KR2012/006140
§ 371 (c)(1),
(2), (4) Date: Jan. 29, 2014

(87) PCT Pub. No.: WO2013/019071
PCT Pub. Date: Feb. 7, 2013

(65) Prior Publication Data
US 2014/0198043 A1    Jul. 17, 2014

(30) Foreign Application Priority Data

Aug. 1, 2011    (KR) .................. 10-2011-0076764

(51) Int. Cl.
*G06F 3/038*    (2013.01)
*G06F 3/0346*    (2013.01)

(52) U.S. Cl.
CPC ............ *G06F 3/0383* (2013.01); *G06F 3/038* (2013.01); *G06F 3/0346* (2013.01)

(58) Field of Classification Search
CPC ...... G06F 3/017; G06F 3/0346; G06F 3/0383; G06F 3/038
See application file for complete search history.

(56) References Cited

U.S. PATENT DOCUMENTS

| 5,745,100 A * | 4/1998 | Bates et al. ............... 345/157 |
| 5,917,486 A * | 6/1999 | Rylander .................. 715/764 |
| 7,109,975 B2 * | 9/2006 | Fedorak et al. ........... 345/173 |
| 2003/0002033 A1* | 1/2003 | Boman .................. 356/139.03 |
| 2003/0236109 A1* | 12/2003 | Nagata ............. G06F 3/0338 455/575.1 |

(Continued)

FOREIGN PATENT DOCUMENTS

| JP | 2008-146619 A | 6/2008 |
| KR | 10-2002-0073028 A | 9/2002 |

(Continued)

OTHER PUBLICATIONS

International Search Report dated Jan. 2, 2013 issued in Application No. PCT/KR2012/0006140.

*Primary Examiner* — Kumar Patel
*Assistant Examiner* — Sejoon Ahn
(74) *Attorney, Agent, or Firm* — KED & Associates, LLP

(57) ABSTRACT

Disclosed are an apparatus for calculating the movement value of a pointer, a method of correcting the movement value of the pointer, and a 3D pointing device. The method of generating correction information of pointer includes acquiring movement data of a 3D pointing device during a predetermined time, adding up values of the movement data, generating control information and moving the pointer if an added-up result of the movement data is greater than or equal to a threshold value, and transmitting the control information to the pointer.

8 Claims, 4 Drawing Sheets

(56) References Cited

U.S. PATENT DOCUMENTS

| | | | |
|---|---|---|---|
| 2005/0012717 A1* | 1/2005 | Park | G06F 3/038 345/163 |
| 2005/0060658 A1* | 3/2005 | Tsukiori | G06F 3/0481 715/765 |
| 2005/0253806 A1* | 11/2005 | Liberty | G06F 1/3215 345/156 |
| 2006/0132447 A1* | 6/2006 | Conrad | 345/168 |
| 2007/0024490 A1* | 2/2007 | Carter | G06T 11/20 342/36 |
| 2008/0106523 A1* | 5/2008 | Conrad | 345/173 |
| 2008/0134784 A1* | 6/2008 | Jeng et al. | 73/514.01 |
| 2008/0204404 A1* | 8/2008 | Kneissler et al. | 345/156 |
| 2008/0283731 A1* | 11/2008 | Karman | 250/208.6 |
| 2009/0128489 A1* | 5/2009 | Liberty et al. | 345/158 |
| 2009/0128491 A1* | 5/2009 | Katayama | G06F 3/038 345/163 |
| 2009/0284495 A1* | 11/2009 | Geaghan et al. | 345/174 |
| 2010/0001953 A1* | 1/2010 | Yamamoto | G06F 3/038 345/158 |
| 2010/0045599 A1* | 2/2010 | Yamamoto | G06F 3/0346 345/158 |
| 2010/0060575 A1* | 3/2010 | Ohta | 345/158 |
| 2010/0169843 A1* | 7/2010 | Yamamoto | G06F 3/017 715/863 |
| 2010/0201619 A1* | 8/2010 | Yamamoto | G06F 3/0346 345/158 |
| 2010/0218024 A1* | 8/2010 | Yamamoto | G06F 1/3203 713/324 |
| 2011/0032185 A1* | 2/2011 | Yamamoto | G06F 3/0346 345/158 |
| 2011/0285651 A1* | 11/2011 | Temple | G06F 3/04883 345/173 |
| 2012/0119989 A1* | 5/2012 | Van Den Brink | 345/157 |
| 2013/0027342 A1* | 1/2013 | Oba | 345/173 |
| 2013/0314318 A1* | 11/2013 | Tseng et al. | 345/158 |
| 2014/0198040 A1* | 7/2014 | Nicholson | G06F 3/0416 345/157 |
| 2015/0149956 A1* | 5/2015 | Kempinski | G06F 3/017 715/784 |
| 2016/0062452 A1* | 3/2016 | Kim | G06F 3/011 345/661 |

FOREIGN PATENT DOCUMENTS

| | | |
|---|---|---|
| KR | 10-2004-0086721 A | 10/2004 |
| KR | 10-2005-0003709 A | 1/2005 |

* cited by examiner

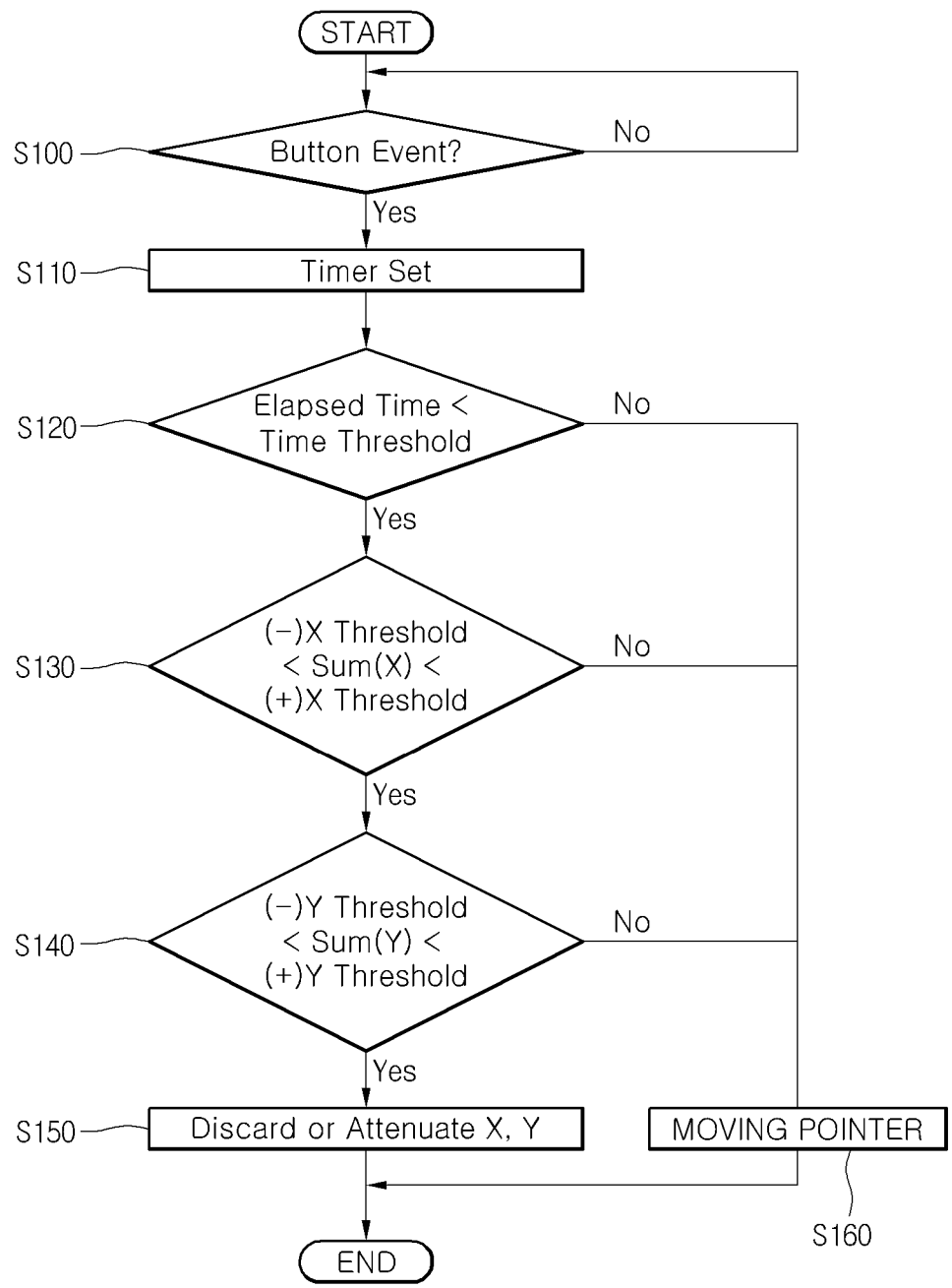

METHOD FOR GENERATING POINTER MOVEMENT VALUE AND POINTING DEVICE USING THE SAME

TECHNICAL FIELD

The disclosure relates to an apparatus for calculating the movement value of a pointer, a method of correcting the movement value of the pointer, and a 3D pointing device. In more detail, the disclosure relates to an apparatus for calculating the movement value of a pointer capable of solving problems caused by errors and mitigating the fine shaking of the pointer, a method of correcting the movement value of the pointer, and a 3D pointing device employing the same.

BACKGROUND ART

In general, a 3D pointing device is used as an input unit to input the command of a user into a central processing unit (central processing part) of a computer body. The operation of the 3D pointing device is re-produced by a pointer (called a cursor of a mouse), which is moved to the position of a required command contained in a basic menu screen image to select the required command, in the state that the basic menu screen image is displayed on the screen of a display such as a cathode-ray tube or a monitor. The pointer is a medium which selects one from a plurality of commands of a menu screen image by re-producing the movement of an electrically and mechanically-structured hardware, which serves as the 3D pointing device, on the screen image of a display device in real time and inputs the selected command into the central processing part.

The position of each command displayed on the menu screen image is memorized as related data in the central processing part. The movement position of the pointer to transfer the command is recognized as the movement position in x and y axes (which serve as horizontal and vertical directions) by the central processing part. In this case, the execution of an algorithm related to the command selected by the pointer is determined in the central processing part depending on if the position of the pointer is matched with the position of the selected command. In the same manner, the user can easily and conveniently input the command of the displayed menu screen image while freely moving the 3D pointing device.

However, when a user grips the body of the 3D pointing device with the hand and performs pointing to an indication point, the indication point may be shaken due to the shaking of the user hand.

In particular, when one point is indicated through the 3D pointing device, the angular vibration of the 3D pointing device is caused due to the shaking of the user hand, so that the pointer may be seriously shaken at the final indication point. Accordingly, the contents that the user wants to deliver are not clearly delivered to the audience, and the user or the audience may feel displeasure. Accordingly, the movement of the pointer, which the user does not want, must be distinguished from the movement of the pointer which the user wants.

DISCLOSURE OF INVENTION

Technical Problem

The disclosure has been made keeping in mind the above problems occurring in the related art, and an object of the present invention is a 3D pointing device equipped with a function of compensating for the shaking of the 3D pointing device in which the shaken degree of the indication point caused by the shaking of the 3D pointing device used in a predetermined presentation is easily measured by using x and y-axis gyrosensors, thereby easily correcting the shaking of the 3D pointing device by a 2-axis driving part installed at one side of a laser diode, previously preventing the indication point of the 3D pointing device from being shaken, and preventing the indicator and the audience from feeling displeasure due to the shaking the indication point.

In order to solve the above problem, according to the related art, a compensation operation is performed by 1) discarding or decreasing movement data during a predetermined time if a button input occurs or 2) discarding or decreasing the movement data if the movement data is less than a preset distance. According to the related art, if both of the two conditions are used and at least one of the two conditions is not satisfied, the movement data are neither discarded nor decreased.

According to the above scheme according to the related art, when the movement (shaking) of the pointer greatly occur after the button has been pressed, the movement (shaking) of the pointer is recognized as the movement intended by a user, so that the unintended movement of the pointer caused by the pressing of the button is not removed sufficiently. If a preset time and a preset distance, which serve as two conditions, are extended in order to prevent the above problem, the problem may be significantly solved. However, the movement data may be discarded or decreased even in the intended operation, such as a drag operation, of the user, so that the operation intended by the user may not be sufficiently performed.

Solution to Problem

According to the disclosure, there is provided a 3D pointing device including a sensor module to measure a posture angle, a processor to calculate a posture angle variation based on the posture angle, add up movement data of a pointer, and correct movement of the pointer if the added-up movement data are greater than or equal to a threshold value, and a memory to store a program and data required to perform a processing operation by the processor.

According to the disclosure, there is provided a method of generating correction information of pointer includes acquiring movement data of a 3D pointing device during a predetermined time, adding up values of the movement data, generating control information and moving the pointer if an added-up result of the movement data is greater than or equal to a threshold value, and transmitting the control information to the pointer.

Advantageous Effects of Invention

As described above, according to the embodiment, the unintended movement occurring when a user presses a button and the intended movement can be effectively distinguished.

BRIEF DESCRIPTION OF DRAWINGS

FIG. 6 is a flowchart showing the method of generating the pointer control information according to the scheme of compensating for the movement data according to the embodiment of the disclosure.

MODE FOR INVENTION

Figure 1:
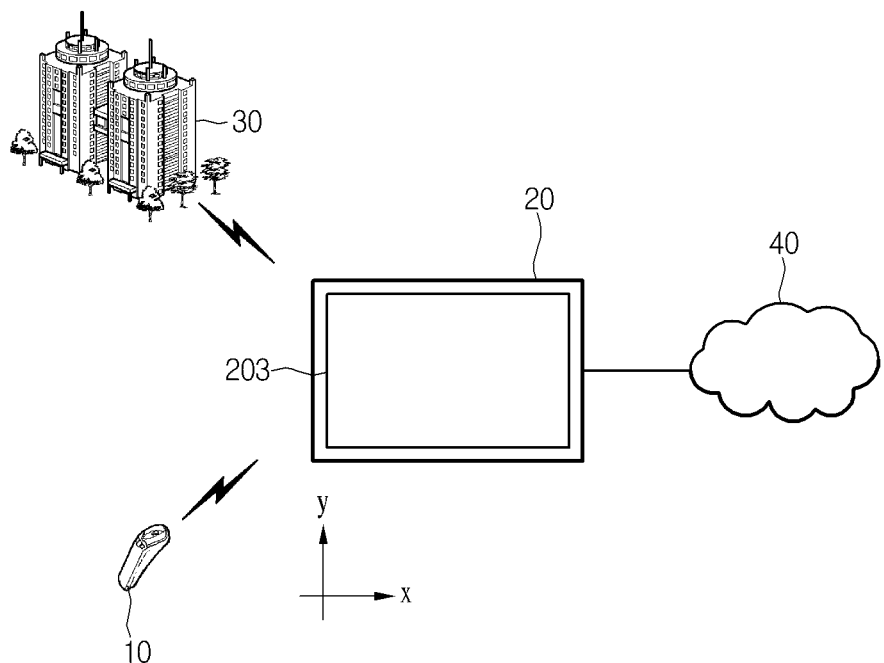
FIG. 1 is a view showing a 3D pointing device according to the related art.

The advantages, the features, and schemes of achieving the advantages and features of the disclosure will be apparently comprehended by those skilled in the art based on the embodiments, which are detailed later in detail, together with accompanying drawings. Hereinafter, exemplary embodiments of the disclosure will be described in detail with reference to accompanying drawings. The same reference numerals will be assigned to the same elements throughout the whole description. In addition, if the function or the structure related to the disclosure and generally known to those skilled in the art make the subject matter of the disclosure unclear, the details of the function or the structure will be omitted.

FIG. 1 is a view showing a 3D pointing device 10 according to the related art. As shown in FIG. 1, the 3D pointing device 10 is applicable to a system including the 3D pointing device 10 and an electronic device 20 that may transceive a signal with the 3D pointing device 10.

The 3D pointing device 10 can detect the movement thereof and transmit information of movement data thereof to the electronic device 20. The movement data may be obtained by individually adding up horizontal-direction information and vertical-direction information, and may correspond to a command of controlling a pointer displayed on a screen image of the electronic device 20.

A step of acquiring the movement data may include a step of calculating an inclination angle of the 3D pointing device.

The step of acquiring the movement data may include a step of calculating a roll angle and a pitch angle. The roll angle may be mapped with one of horizontal and vertical directions of the screen image, and the pitch angle may be mapped with the remaining one of the horizontal and vertical directions of the screen image.

A user may control the pointer displayed on the screen image of the electronic device 20 by moving the 3D pointing device 10. The 3D pointing device 10 may include at least one key button. The user may input various commands through at least one key button.

The electronic device 20 may include all devices capable of receiving a signal from the 3D pointing device 10. In addition, instead of the electronic device, a screen used together with a projector can be used.

For example, the electronic device 20 may include a digital television (DTV) or a personal computer (PC). The electronic device 20 may output a broadcasting signal by receiving the broadcasting signal from a broadcasting station 30. In addition, the electronic device 20 may include a device capable of accessing the Internet 40 through a transmission control protocol/Internet protocol (TCP/IP).

Figure 2:
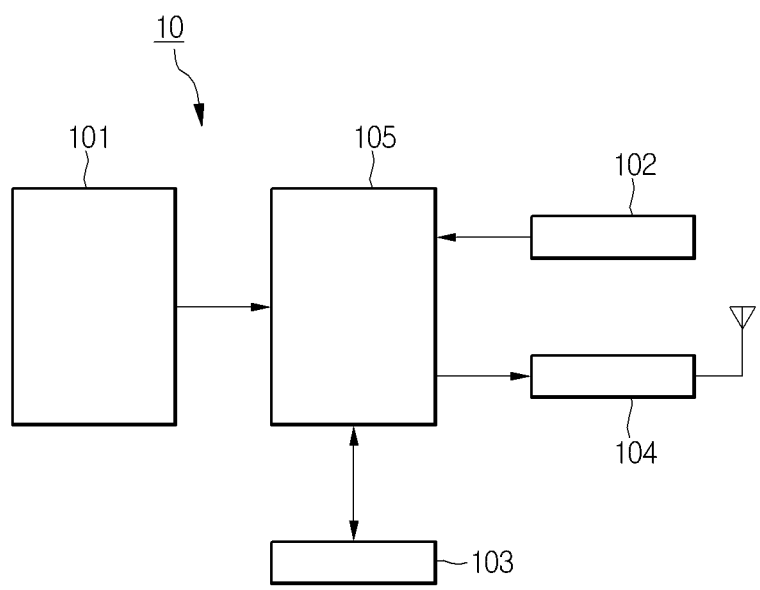
FIG. 2 is a block diagram showing a 3D pointing device according to one embodiment of the disclosure.

FIG. 2 is a block diagram showing the 3D pointing device 10 according to the embodiment of the disclosure. Hereinafter, the 3D pointing device 10 according to one embodiment of the disclosure will be described in detail with reference to FIG. 2.

The 3D pointing device 10 according to one embodiment of the disclosure may include a sensor 101, a key button 102, a memory 103, a communication module 104, and a controller 105.

The sensor 101 acquires information of the movement data of the 3D pointing device 10.

The information of the movement data according to the disclosure may include information of the movement data detected by the sensor 101.

Figure 3:
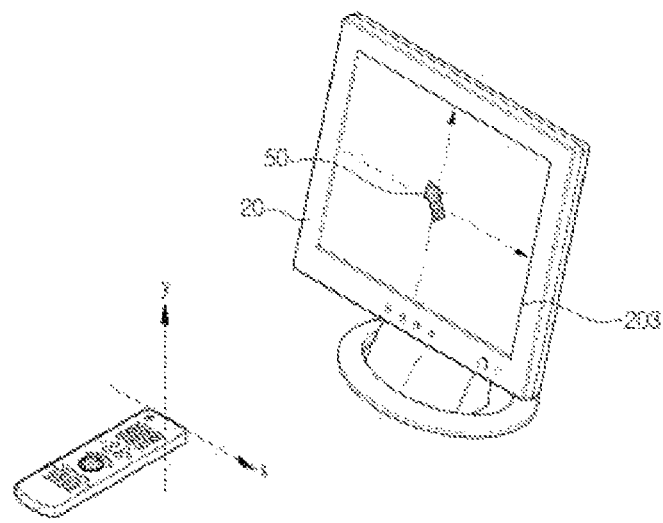
FIG. 3 is a view showing an example in which a scheme of controlling a pointer is realized.

FIG. 3 is a view showing an example in which a scheme of controlling a pointer is realized. As shown in FIG. 3, the 3D pointing device 10 is shown in a state parallel to the ground surface without being inclined. As shown in FIG. 3, a pointer 50 displayed on a display 203 is fixedly placed onto a preset position, and the preset position refers to the center of the display 203. If the user changes the angle of the signal emitted from the 3D pointing device 10 in a positive X axis direction serving as the horizontal direction, the pointer 50 placed at the center of the display 203 is moved in the positive X axis direction.

Figure 4:
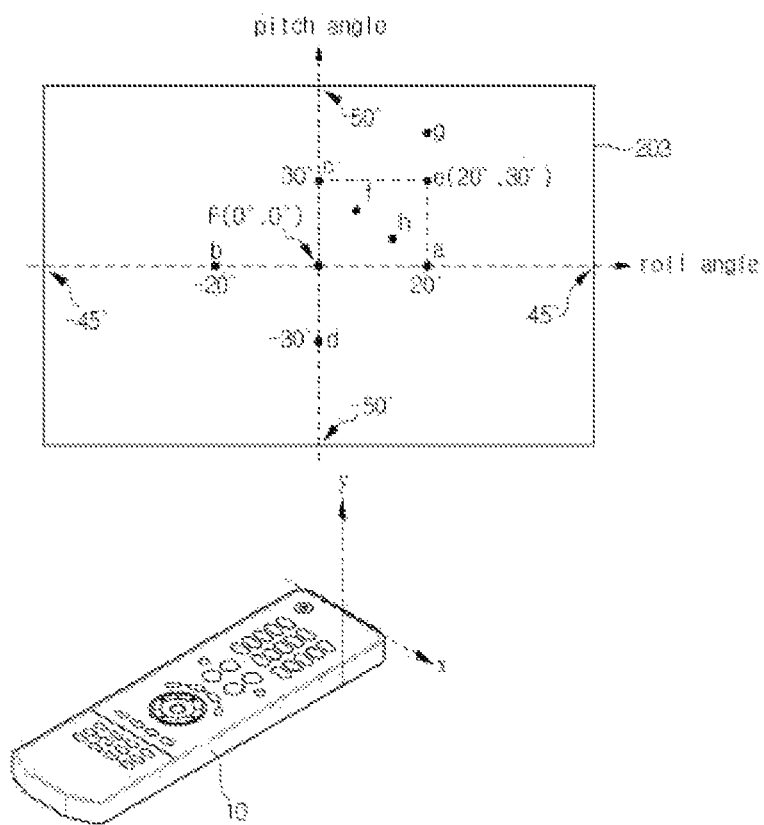
FIG. 4 is a view showing an example in which an inclination angle is mapped with a screen image of an electronic device.

FIG. 4 is a view showing an example in which the inclination angle is mapped with a screen image of the electronic device 20. Referring to FIG. 4, the roll angle may be mapped with the horizontal direction (X axis direction) of the screen image, and the pitch angle may be mapped with the vertical direction (Y axis) of the screen image.

For example, as shown in FIG. 4, a position F represents a state in which the 3D pointing device 10 is horizontally placed with respect to the ground surface (roll angle=0, and pitch angle=0). If the 3D pointing device 10 is rotated at an angle of 20 degrees in the X axis direction from the position F (while maintaining the center of the Y axis), the pointer 50 may correspond to a position a on the display 203 of the electronic device 20. If the 3D pointing device 10 is rotated at an angle of −30 degrees in the Y axis direction from the position F (while maintaining the center of the X axis) (position D), the pointer 50 may correspond to a position d on the display 203 of the electronic device 20.

In the same manner, the rotation positions B and C of the 3D pointing device 10 may correspond to positions b and c, respectively. If the 3D pointing device 10 rotates at an angle of 20 degrees in the X axis direction from the position F while rotating an angle of 30 degrees in the Y axis direction, the pointer 50 may correspond to a position e on the display 203.

When a user presses the key button while pointing on a PC or a TV by using the 3D pointing device 10, the user attempts to maintain the pointing at a desirable position. Accordingly, X and Y values, which are the movement data generated when the key button is pressed, are randomly distributed about a position to which a user wants to point. In addition, the X value of the movement data represents a positive value when the pointer 50 moves rightward from a pointed position and represents a negative value when the pointer 50 moves leftward from the pointed position. The Y value of the movement data represents a positive value when the pointer 50 moves upward from the pointed position and represents a negative value when the pointer 50 moves downward from the pointed position. Accordingly, the probability, in which the sum of unintended movement values of the 3D pointing device 10 is greatly converged toward 0, is greatly represented. In addition, since the intended movement has a directionality, the intended movement may be increased or decreased in one of X and Y directions.

The unintended movement, which is caused when the button of the 3D pointing device is pressed, is removed through two conditions based on the above description in which the tow conditions are 1) the movement data are discarded or decreased during a predetermined time if the button is input, and 2) the values of the movement data are added up whenever the button is scanned, and the movement data is discarded or decreased if the sum of the movement data is less than the predetermined value. If both of the two conditions are used and at least one of the two conditions is not satisfied, the movement data are neither discarded nor decreased.

The scheme can effectively distinguish unintended motion, which occurs when the button is pressed, from the movement intended by the user as compared with a scheme of determining if the movement occurs by a preset distance according to the related.

For example, on the assumption that a user presses a button at a position f, the pointer 50 is moved from the position f to the position g and then moved to the position for the position h, when employing the scheme according to the related art of 1) discarding or decreasing movement data during a predetermined time if a button input occurs or 2) discarding or decreasing the movement data if the movement data is less than a preset distance, the movement distance during the present time, that is, the straight distance from the position f to the position f, or the straight distance from the position f to the position h is regarded as movement data. Accordingly, if the movement distance is the straight distance from the position f to the position f, the movement data become 0. In addition, if the straight distance from the position f to the position h is less than the preset distance, the movement data are discarded or decreased. However, even if the user intends the movement between the positions through a drag operation, the movement data may be discarded or decreased.

Figure 5:
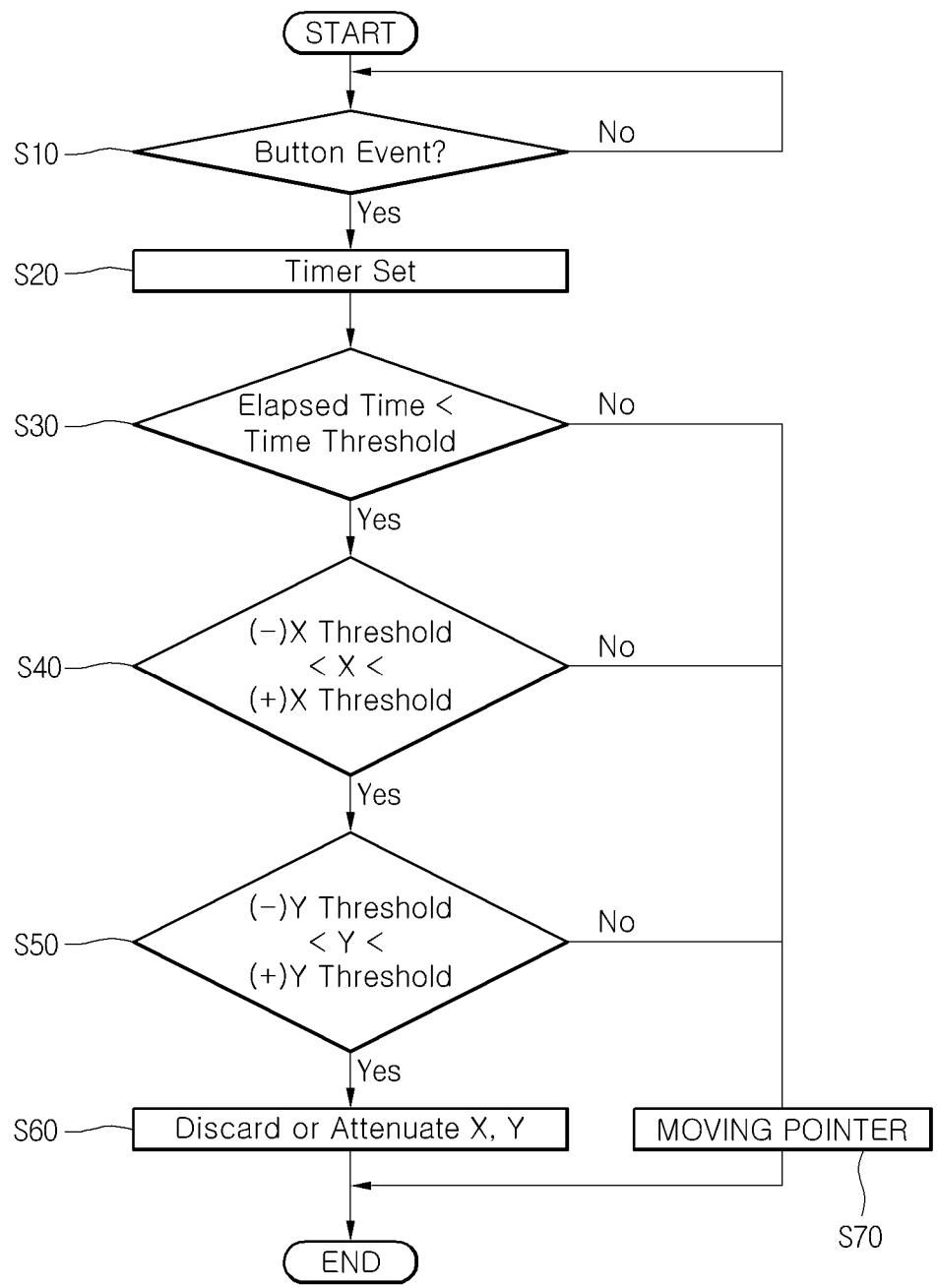
FIG. 5 is a flowchart showing a method of generating pointer control information according to a scheme of compensating for movement data.

FIG. 5 is a flowchart showing a method of generating pointer control information according to a scheme of compensating for movement data. Referring to FIG. 5, if a button event occurs (step S10), the time in which the event occurs is checked (step S20).

If the time in which the event occurs is less than reference time (step S30), the movement between positions is determined.

In this case, the X value and the Y value may be individually determined. In addition, the X value and the Y value may be simultaneously determined.

If the X value is moved in the range of the threshold value (step S40), and the Y value is moved in the range of the threshold value (step S50), the movement data value is discarded or decreased (step S60).

Meanwhile, if the time in which the event occurs is greater than the reference time, or if the X value and the Y value are out of the range of the threshold value, a determination is made that the 3D pointing device 10 is moved (step S70).

In this case, even if the user intentionally moves the pointer 50 on the path of f→g→f or f→g→h, if the pointer 50 moves within a present time range, the movement data value may be discarded or decreased.

FIG. 6 is a flowchart showing the method of generating the pointer control information according to the scheme of compensating for the movement data according to the embodiment of the disclosure. If the user inputs a button (step S100), movement time is set (step S110).

Next, it is determined if the set time is within the range of the threshold time (step S120). If data movement occurs within the range of the threshold time, the values of the movement data of the X and Y axis are added up (steps S130 and S140). Although the data movement on the X axis is first determined in FIG. 6, the data movement on the Y axis may be first determined.

If the movement data values on the X axis and the Y axis, which are added up within the range of the threshold time, are less than a threshold value, the movement data values are discarded or decreased (step S150) and expressed on the display 203. If one of the movement data values on the X axis and the Y axis, which are added up within the range of the threshold time, is greater than the threshold value, the movement data values are expressed on the display 203 until next button input occurs (step S160). The decrease width of the movement data values may be ½ to ⅒ of original data values.

The matching relation between the inclination angle of the 3D pointing device 10 and the positions on the display 203 may be previously determined based on a scaling factor or a mapping coefficient. The scaling factor or the mapping coefficient may be determined based on the resolution of the display 203. In addition, the scaling factor or the mapping coefficient may be determined by a user. In general, for example, the user may previously determine the maximum inclination angle in which the 3D pointing device 10 is inclined, and my match the maximum inclination angle with the edge of the display 203. FIG. 4 shows a case in which the maximum left or right roll angle is determined as 45 degrees, and the maximum up or down pitch angle is determined as 50 angles. The maximum inclination angle corresponding to the edge of the display 203 may be varied.

The matching relation between the inclination angle of the 3D pointing device 10 and the positions on the display 203 may be determined based on the scaling factor or the mapping coefficient that are dynamically variable. The controller 105 can recognize the shaking of the 3D pointing device 10 by using the information of the inclination and automatically correct the scaling factor or the mapping coefficient by taking the shaking of the 3D pointing device 10 into consideration. For example, the controller 105 can detect the shaking degree obtained from the recent movement of the 3D pointing device 10 and update the scaling factor by taking the shaking degree into consideration when the 3D pointing device 10 is provided at a specific posture (for example, when both of the roll angle and the pitch angle are 0).

The controller 105 can create information of 2D movement in which the pointer is moved on the display 203. The information of the 2D movement may include a coordinate of a target position to which the pointer is moved. In addition, the information of the 2D movement may include moving distance and direction in which the pointer must be moved.

The coordinate and the moving distance may be expressed by using pixels. The controller 105 creates the information of the pointer control. The information of the pointer control may include the information of the 2D movement created in the step S140.

The controller 105 may transmit the information of the pointer control to the electronic device 20 through the communication module 104.

Since the variations of data movement are corrected by adding up the variations of the data movement within a preset time as described above, the unintended movement occurring when the button is pressed and the movement intended by the user can be more effectively distinguished as compared with a scheme of determining if the pointer is moved by a preset distance.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A method of generating correction information of pointer, the method comprising:
   detecting a button input event of a pointing device at a first position;
   determining whether the button input event occurs within a predetermined threshold time;
   storing values of movement data of the pointer during a predetermined period of time, wherein the values include a first horizontal-direction value and a first vertical-direction value between the first position and a second position when the pointer is moved from the first position to the second position and a second horizontal-direction value and a second vertical-direction value between the second position and a third position when the pointer is moved from the second position to the third position; adding up values of the all the movement data stored during the predetermined period of time;
   generating control information for moving the pointer if an added-up result of the values is greater than or equal to a threshold value and if the button input event occurs outside of the predetermined threshold time;
   transmitting the control information to a target device, wherein the target device displays the pointer on a screen of the target;
   discarding or decreasing the values of the movement data including the first and second horizontal-direction values and the first and second vertical-direction if both the added-up result of the values is less than the threshold value and the button input event occurs within the predetermined threshold time
   recognizing the shaking of the pointing device using information of the inclination; and correcting the scaling factor or the mapping coefficient by taking the shaking of the pointing device into consideration,
   wherein the values of movement data of the pointer are determined based on inclination information including an inclination angle of the pointing device, wherein matching relation between the inclination angle and a position on the screen is determined based on a scaling factor or mapping coefficient, and wherein the decreased width of the values of the movement data correspond to $\frac{1}{2}$ to $\frac{1}{10}$ of an original data value.

2. The method of claim 1, wherein the pointer is controlled to move corresponding to the added-up result of the values after the predetermined time from the time in which the button event occurs.

3. The method of claim 1, wherein the values of movement data are obtained individually in horizontal-direction and vertical-direction.

4. The method of claim 1, wherein the inclination angle includes a roll angle and a pitch angle, wherein the roll angle is mapped with one of a horizontal direction and a vertical direction of a screen, and the pitch angle is mapped with a remaining one of the horizontal direction and the vertical direction of the screen.

5. A pointing device comprising: a sensor to acquire values of movement data of a pointer during a predetermined period of time after a button input event of the pointing device has occurred;
   a processor to add up values of the all movement data acquired during the predetermined time, determine whether the button input event occurred within a predetermined threshold time, and generate control information for moving the pointer if the added-up result of the values is greater than or equal to a threshold values and if the button input event occurs outside of the predetermined threshold time;
   a communicator to transmit the control information to a target device; and
   a memory to store a program and data required to perform a processing operation by the processor, wherein the values include a first horizontal-direction value and a first vertical-direction value between the first position and a second position when the pointer is moved from the first position to the second position, and a second horizontal-direction value and a second vertical-direction value between the second position and a third position when the pointer is moved from the second position to a third position, and wherein the target device displays the pointer on a screen of the target device,
   wherein the processor discards or decreases the values of the movement data including the first and second horizontal-direction values and the first and second vertical-direction values if both the added-up result of the values is less than the threshold value and the button input event occurs within the predetermined threshold time, wherein the process is further configured to recognize the shaking of the pointing device using information of the inclination, and correct the scaling factor or the mapping coefficient by taking the shaking of the pointing device into consideration,
   wherein the movement data of the pointing device is acquired based on inclination information including an inclination angle of the pointing device, wherein matching relation between the inclination angle and a position on the screen is determined based on a scaling factor or mapping coefficient, wherein the decreased width of the values of the movement data correspond to $\frac{1}{2}$ to $\frac{1}{10}$ of an original data value.

6. The pointing device of claim 5, wherein the pointer is moved corresponding to the added-up result of the values after the predetermined period of time from the time in which the button event has occurred.

7. The pointing device of claim 5, wherein the movement data is obtained by individually adding up horizontal-direction information and vertical-direction information.

8. The pointing device of claim 5, wherein the inclination angle includes a roll angle and a pitch angle, wherein the roll angle is mapped with one of a horizontal direction and a vertical direction of a screen, and the pitch angle is mapped with a remaining one of the horizontal direction and the vertical direction of the screen.

\* \* \* \* \*